United States Patent
Yamashita

(10) Patent No.: US 10,158,276 B2
(45) Date of Patent: Dec. 18, 2018

(54) ROTOR PRODUCTION METHOD

(71) Applicant: TOYOTA JIDOSHA KABUSHIKI KAISHA, Toyota-shi, Aichi-ken (JP)

(72) Inventor: Osamu Yamashita, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 114 days.

(21) Appl. No.: 15/203,492

(22) Filed: Jul. 6, 2016

(65) Prior Publication Data
US 2017/0012509 A1   Jan. 12, 2017

(30) Foreign Application Priority Data
Jul. 8, 2015 (JP) .................. 2015-137282

(51) Int. Cl.
*H02K 15/03* (2006.01)
*H01F 1/057* (2006.01)
*H01F 41/02* (2006.01)

(52) U.S. Cl.
CPC ............ *H02K 15/03* (2013.01); *H01F 1/0576* (2013.01); *H01F 1/0577* (2013.01); *H01F 41/0253* (2013.01); *H01F 41/0273* (2013.01); *Y10T 29/49076* (2015.01); *Y10T 29/49078* (2015.01)

(58) Field of Classification Search
CPC ............ H01F 41/0266; H01F 41/0273; H01F 1/0576; H01F 1/0577; Y10T 29/49076; Y10T 29/49078; B23B 2307/208; H02K 15/03
See application file for complete search history.

(56) References Cited

U.S. PATENT DOCUMENTS

| | | | | |
|---|---|---|---|---|
| 3,239,919 A | * | 3/1966 | Fulvio Levi | B21C 37/047 252/62.55 |
| 6,800,967 B2 | * | 10/2004 | Oshima | H02K 1/276 310/12.25 |
| 2002/0132136 A1 | * | 9/2002 | Roshen | B32B 7/02 428/810 |
| 2004/0046469 A1 | * | 3/2004 | Oshima | H02K 1/276 310/156.21 |

(Continued)

FOREIGN PATENT DOCUMENTS

| CN | 102754316 A | 10/2012 |
|---|---|---|
| CN | 104737251 A | 6/2015 |

(Continued)

*Primary Examiner* — Livius R Cazan
(74) *Attorney, Agent, or Firm* — Sughrue Mion, PLLC

(57) ABSTRACT

A rotor production method includes: a first step of arranging a plurality of sintered bodies side by side with an insulating lubricant applied to an interface of at least one of the sintered bodies adjacent to each other, and then housing the sintered bodies in a cavity of a molding die such that the sintered bodies are arranged side by side in the cavity, the sintered bodies being precursors of a plurality of split magnets constituting one rare-earth magnet; a second step of turning the sintered bodies into the split magnets by performing hot working to impart magnetic anisotropy to the sintered bodies arranged in the cavity, and producing an integrated magnet in which the split magnets are integrated together with the lubricant interposed therebetween; and a third step of producing a rotor of a motor by inserting the integrated magnet into a magnet slot of the rotor.

5 Claims, 5 Drawing Sheets

(56) References Cited

U.S. PATENT DOCUMENTS

| | | | |
|---|---|---|---|
| 2004/0067154 A1* | 4/2004 | Kanekiyo | B22D 11/0611 |
| | | | 419/12 |
| 2010/0104767 A1* | 4/2010 | Sskuma | B22F 1/025 |
| | | | 427/535 |
| 2012/0080972 A1 | 4/2012 | Kanada | |
| 2015/0287530 A1 | 10/2015 | Ichigozaki et al. | |
| 2017/0092399 A1* | 3/2017 | Li | H01F 7/021 |

FOREIGN PATENT DOCUMENTS

| | | | |
|---|---|---|---|
| JP | 02-250921 A | | 10/1990 |
| JP | 02-250922 A | | 10/1990 |
| JP | 2003-134750 A | | 5/2003 |
| JP | 2013138127 A | * | 7/2013 |

\* cited by examiner

ROTOR PRODUCTION METHOD

INCORPORATION BY REFERENCE

The disclosure of Japanese Patent Application No. 2015-137282 filed on Jul. 8, 2015 including the specification, drawings and abstract is incorporated herein by reference in its entirety.

BACKGROUND OF THE INVENTION

1. Field of the Invention

The invention relates to a method of producing a rotor of a motor.

2. Description of Related Art

In the automobile industry, development of higher-powered, lighter and more compact driving motors has been constantly advanced for the purpose of further improving travelling performance of hybrid vehicles and electric vehicles. Similarly, household electric appliance manufacturers have focused on development of more compact and higher-powered motors incorporated in various kinds of household electric appliances.

How to reduce various kinds of losses caused inside motors is an important issue to be addressed in order to improve performance of the motors. For example, after application of electricity to a motor, a copper loss due to a conductor resistance loss is caused in coils of the motor, and an iron loss (or a high-frequency iron loss) due to an eddy-current loss or a hysteresis loss is caused in a rotor or a stator of the motor. These losses lower the motor efficiency and the torque performance. The eddy-current loss is a loss caused by a change in the magnetic flux density, and the hysteresis loss is a loss due to a magnetic flux density waveform.

Examples of a method for reducing the eddy-current loss include a method of producing a rotor by inserting permanent magnets (rare-earth magnets) each constituted by a plurality of split magnets into magnet slots of the rotor. Methods of producing such split magnets are described in Japanese Patent Application Publication No. 2003-134750 (JP 2003-134750 A), Japanese Patent Application Publication No. 2-250921 (JP 2-250921 A), and Japanese Patent Application Publication No. 2-250922 (JP 2-250922 A).

The method of producing a permanent magnet described in JP 2003-134750 A includes a first step of splitting a permanent magnet base material into a plurality of magnet pieces, a second step of performing an insulation coating process on the entirety of all the surfaces of each of the magnet pieces obtained by splitting the permanent magnet base material, a third step of joining together the magnet pieces that have undergone the insulation coating process, a fourth step of machining a joined body such that the joined body has predetermined dimensions, and a fifth step of performing an insulation coating process on the entirety of all the surfaces of the joined body after machining.

According to the method of producing a rare-earth magnet described in JP 2-250921 A, a plurality of alloy materials for a rare-earth magnet is sealed in a metal capsule with a lubricant, and hot forging is performed while the metal capsule is restrained in the width direction. According to the method of producing a rare-earth magnet described in JP 2-250922 A, hot rolling is performed in the same manner as that described in JP 2-250921 A.

With the production method described in JP 2003-134750 A, it is possible to produce a permanent magnet configured to more reliably reduce generation of an eddy current. However, this production method requires many production steps, such as the step of performing an insulation coating process on the entirety of all the surfaces of each of the magnet pieces, and the step of joining together the magnet pieces that have undergone the insulation coating process. This makes the production of a permanent magnet considerably cumbersome and complicated.

Further, an integrated magnet constituted by a plurality of magnet pieces produced individually as described above may fail to be accurately inserted into and installed in a magnet slot of a rotor, if the dimensional accuracy of each of the magnet pieces is not rigorously controlled. This is because the dimensional deviation of the whole integrated magnet is the sum of the dimensional deviations of all the magnet pieces.

With the production methods described in JP 2-250921 A and JP 2-250922 A, it is possible to stably produce a rare-earth magnet having a good magnetic property. However, there is a need to prepare a metal capsule for each of the rare-earth magnets to be produced, and hot forging or hot rolling is performed after a plurality of alloy materials is sealed in the metal capsule. Thus, these production methods may require a lot of time and effort.

SUMMARY OF THE INVENTION

The invention provides a rotor production method of efficiently producing a rotor including rare-earth magnets configured to reduce an eddy-current loss.

An aspect of the invention relates to a rotor production method including: a first step of arranging a plurality of sintered bodies side by side with an insulating lubricant applied to an interface of at least one of the sintered bodies adjacent to each other, and then housing the sintered bodies in a cavity of a molding die such that the sintered bodies are arranged side by side in the cavity, the sintered bodies being precursors of a plurality of split magnets constituting one rare-earth magnet; a second step of turning the sintered bodies into the split magnets by performing hot working to impart magnetic anisotropy to the sintered bodies arranged side by side in the cavity, and producing an integrated magnet in which the split magnets are integrated with each other with the lubricant interposed between the split magnets; and a third step of producing a rotor of a motor by inserting the integrated magnet into a magnet slot of the rotor.

In the rotor production method according to the aspect of the invention, hot working is performed in the molding die to produce the split magnets, the integrated magnet in which the split magnets are integrated with each other is removed from the molding die, and the integrated magnet is inserted, as it is, into the magnet slot of the rotor to produce the rotor.

In the first step, before the sintered bodies are housed in the molding die so as to be arranged side by side, the insulating lubricant is applied to the interface of at least one of the sintered bodies adjacent to each other. In this case, "applying the lubricant to the interface of at least one of the sintered bodies adjacent to each other" may be applying the lubricant to the interface (side surface) of one of the sintered bodies adjacent to each other or may be applying the lubricant to the interfaces (side surfaces) of both of the sintered bodies adjacent to each other.

Because the insulating lubricant is applied to the interfaces of the sintered bodies adjacent to each other before hot working, the insulating lubricant is also present on interfaces of the split magnets adjacent to each other, which are formed by hot working. Thus, a rare-earth magnet in which insulation between the split magnets is ensured and which provides a good eddy-current loss reducing effect is produced.

The molding die includes a die, and upper and lower punches that are slidable in the die. In the rotor production method according to the aspect of the invention, the sintered bodies are arranged side by side and housed in the cavity of the molding die without being housed in a metal capsule, or the like, and then hot working is performed.

The hot working is forging (upset forging). The magnetic anisotropy is imparted to the sintered bodies by hot working to form the split magnets.

As described above, because the split magnets are produced by simultaneously imparting the magnetic anisotropy to the sintered bodies in one molding die, the integrated magnet in which the split magnets having homogeneous magnetic anisotropy are integrated with each other is produced.

Further, the plurality of sintered bodies is subjected to hot working in one molding die to produce the plurality of split magnets, and the integrated magnet constituted by the split magnets is produced in one molding die. Thus, the dimensional deviation is the dimensional deviation of the whole integrated magnet, instead of the sum of the dimensional deviations of the individual split magnets. Therefore, in the rotor production method according to the aspect of the invention, the dimensional accuracy of the integrated magnet need not be controlled rigorously, unlike in a production method in which split magnets are produced independently from each other and then integrated with each other. In this production method, the dimensional deviation of the whole integrated magnet is the sum of the dimensional deviations of all the split magnets. Therefore, the dimensional accuracy of each of the split magnets needs to be rigorously controlled.

The sintered bodies are plastically deformed by a forging pressure during hot working to be turned into the split magnets. However, the split magnets are connected to each other via the lubricant on the interfaces thereof to such a degree that they are not separated from each other during subsequent handling, thereby forming the integrated magnet. That is, "integrated magnet" is not limited to a magnet in which split magnets are firmly connected to each other, and may be a magnet in which split magnets are lightly connected to each other to such a degree that they are not separated from each other during handling.

Because the integrated magnet has such a connection strength that the split magnets are not separated from each other during handling, the integrated magnet removed from the molding die can be inserted, as it is, into the magnet slot of the rotor. In this case, "inserting the integrated magnet, as it is, into the magnet slot" means inserting the integrated magnet into the magnet slot without splitting it again, and does not exclude inserting the integrated magnet into the magnet slot after performing machining, such as adjusting surface texture and dimensions.

In the above aspect, the lubricant may be boron nitride. When the lubricant made of boron nitride is used, the coating thickness of the lubricant before hot working may be set to be equal to or more than 10 μm.

The temperature (forging temperature) when the sintered bodies are subjected to hot working may be within a range of about 600 to 900° C. Examples of the lubricant that can be used at this forging temperature include boron nitride and graphite. Among these examples, the lubricant having an insulating property is boron nitride.

According to verification made by the inventor, 10 μm is specified as the minimum coating thickness before hot working, at which a sufficient insulating property is ensured when boron nitride is used as the insulating lubricant.

Each of the sintered bodies may have a Nd—Fe—B-based main phase with a nanocrystalline structure, and a grain boundary phase of a Nd—X alloy, where X is a metal element, the grain boundary phase being present around the main phase.

The Nd—X alloy constituting the grain boundary phase may be any one of Nd—Co, Nd—Fe, Nd—Ga, Nd—Co—Fe, and Nd—Co—Fe—Ga, or may be a mixture of at least two of Nd—Co, Nd—Fe, Nd—Ga, Nd—Co—Fe, and Nd—Co—Fe—Ga. The Nd—X alloy may be in a Nd rich state.

As can be understood from the above description, with the rotor production method according to the aspect of the invention, the integrated magnet in which the split magnets are integrated with each other via the insulating lubricant on the interfaces thereof is produced in one molding die, and the rotor is produced by inserting the integrated magnet, as it is, into the magnet slot of the rotor. Thus, the rotor including the rare-earth magnet configured to reduce an eddy-current loss is efficiently produced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
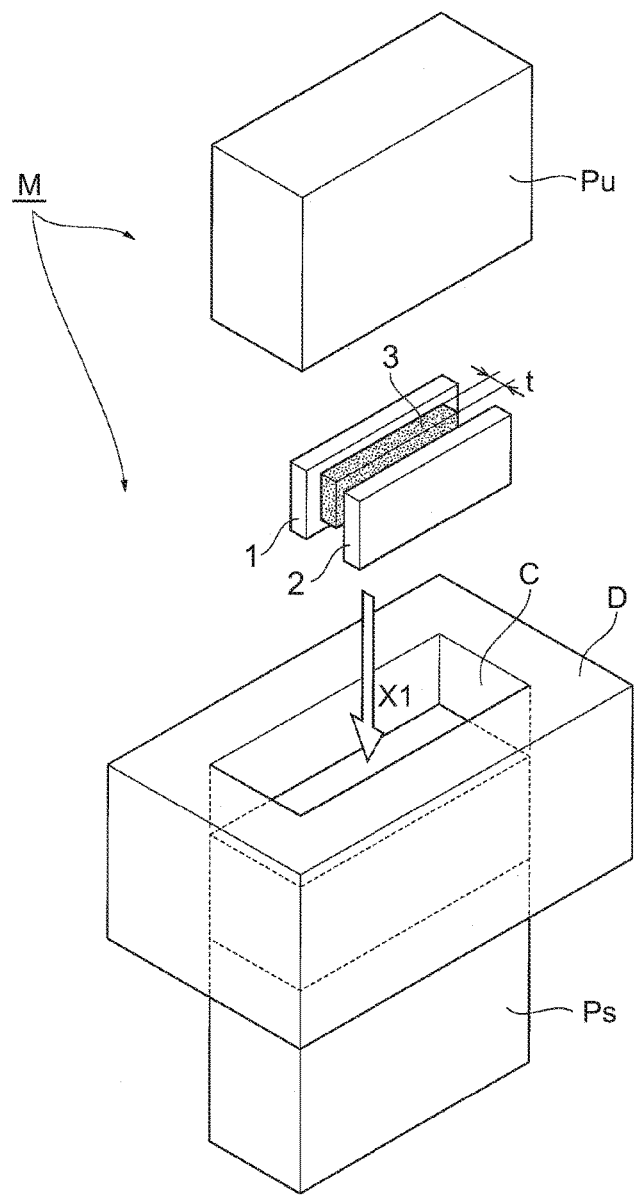
FIG. 1 is a perspective view illustrating a first step of a rotor production method according to an embodiment of the invention.

Hereinafter, a rotor production method according to an embodiment of the invention will be described with reference to the accompanying drawings. An integrated magnet illustrated in the drawings is formed by subjecting two sintered bodies to hot working. Alternatively, three or more sintered bodies may constitute an integrated magnet. In a rotor illustrated in the drawing, one integrated magnet forms one magnetic pole. Alternatively, two integrated magnets in a generally V-shape may form one magnetic pole.

Figure 2:
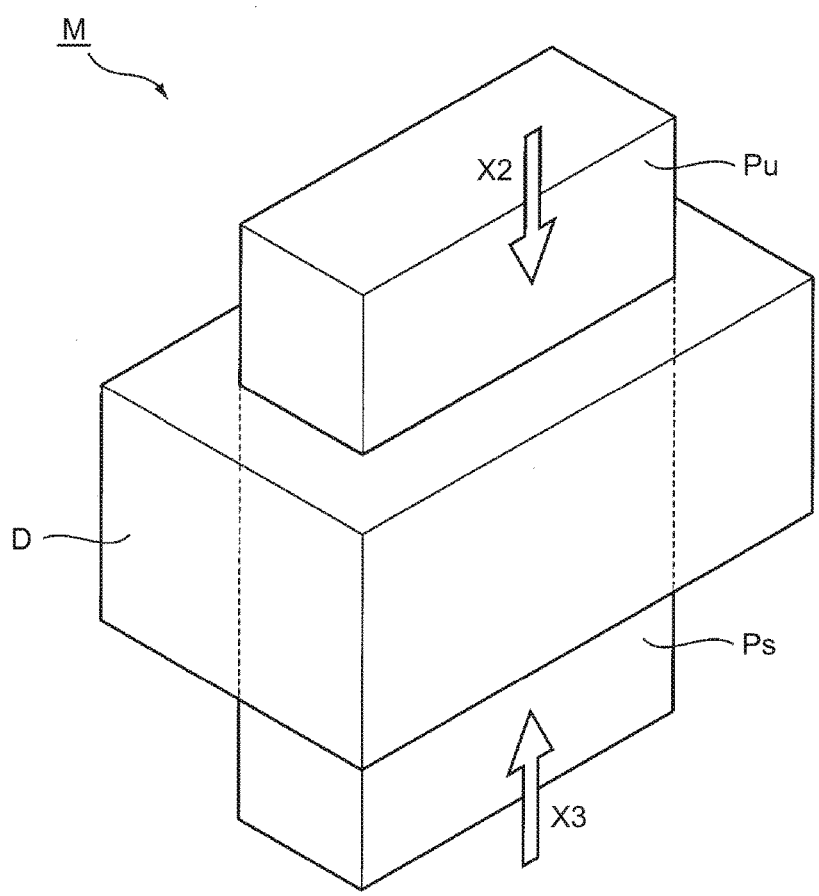
FIG. 2 is a perspective view illustrating a part of a second step of the rotor production method.
Figure 3:
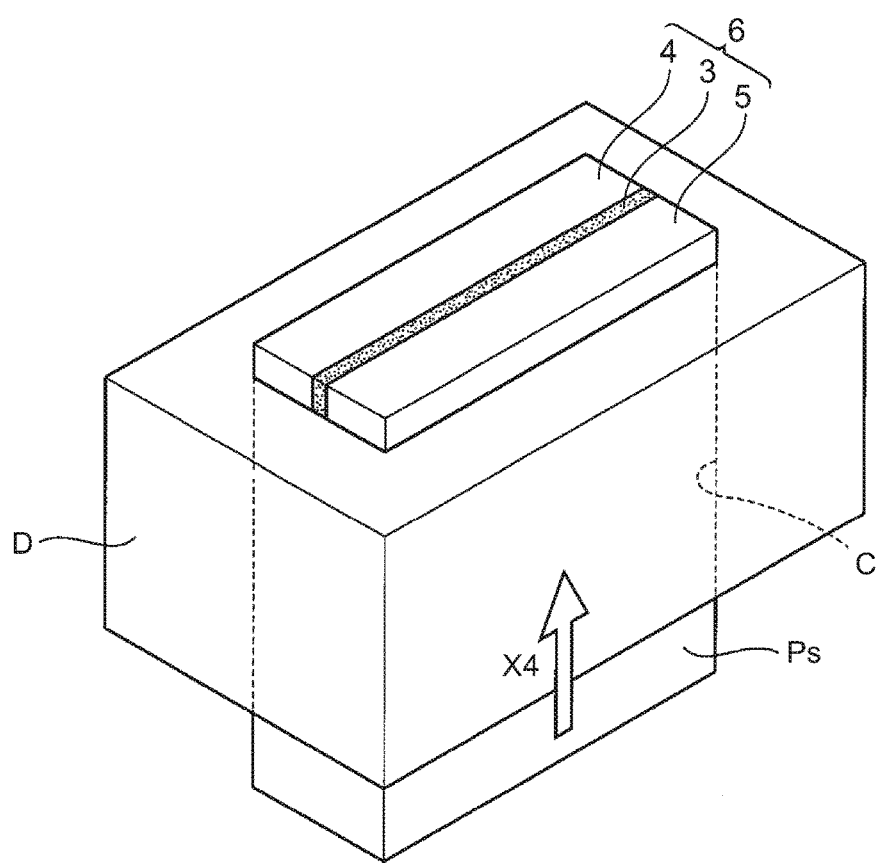
FIG. 3 is a perspective view illustrating another part of the second step subsequent to the part in FIG. 2.
Figure 4:
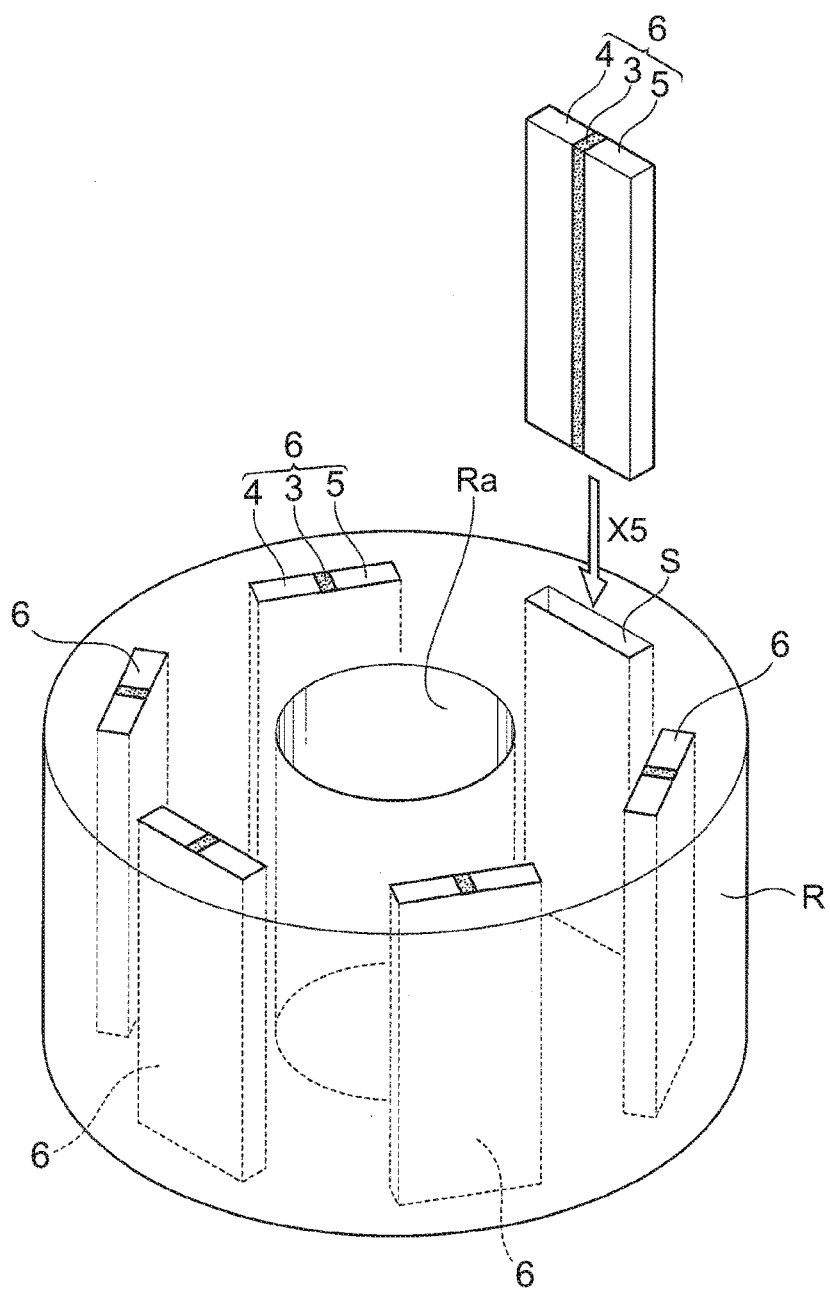
FIG. 4 is a perspective view illustrating a third step of the rotor production method.

The rotor production method according to the embodiment will be described below. FIG. 1 is a perspective view illustrating a first step of the rotor production method according to the embodiment. FIGS. 2 and 3 are perspective views sequentially illustrating a second step of the rotor production method. FIG. 4 is a perspective view illustrating a third step of the rotor production method.

First, a molding die M is provided. As illustrated in FIG. 1, the molding die M includes a die D, and an upper punch Pu and a lower punch Ps that slide inside the die D. A cavity C is defined by the die D, the upper punch Pu, and the lower punch Ps.

Two sintered bodies 1, 2 are arranged side by side and housed in the cavity C (the sintered bodies 1, 2 are housed in the cavity C in a direction X1) (first step).

The sintered bodies 1, 2 are produced by subjecting magnet powder to pressure-forming in a molding die (not illustrated) under a high temperature atmosphere of about 700° C.

A method of producing magnet powder for forming the sintered bodies 1, 2 will be described below. By a melt spinning method performed by using a single roll, a quenched thin strip (a quenched ribbon) is produced by subjecting an alloy ingot to high-frequency melting in a furnace (not illustrated) in which the pressure is reduced to 50 kPa or less, and then injecting a molten metal onto a copper roll. The molten metal has a composition that provides a rare-earth magnet. Then, the produced quenched thin strip is roughly crushed to produce the magnet powder. The particle size of the magnet powder is adjusted to be within a range from 75 µm to 300 µm.

The sintered bodies 1, 2 each have, for example, a Nd—Fe—B-based main phase (in which the average particle size is equal to or less than 300 nm, and the grain size is, for example, about 50 nm to 200 nm) with a nanocrystalline structure, and a grain boundary phase of a Nd—X alloy (where X is a metal element). The grain boundary phase is present around the main phase. The Nd—X alloy constituting the grain boundary phase is an alloy containing Nd and at least one of Co, Fe, Ga, and the like. The Nd—X alloy is, for example, any one of Nd—Co, Nd—Fe, Nd—Ga, Nd—Co—Fe, and Nd—Co—Fe—Ga. Alternatively, the Nd—X alloy is a mixture of at least two of Nd—Co, Nd—Fe, Nd—Ga, Nd—Co—Fe, and Nd—Co—Fe—Ga. Thus, the Nd—X alloy is in the Nd rich state.

Before the sintered bodies 1, 2 are housed in the cavity C, an insulating lubricant 3 is applied to a side surface of the sintered body 1, the side surface facing the sintered body 2.

The application amount of the lubricant 3 is set such that, when the sintered bodies 1, 2 are plastically deformed through forging in the molding die M, the lubricant 3 is spread all over the interfaces of both the sintered bodies 1, 2 and a predetermined coating thickness of the lubricant 3 is achieved.

A coating thickness t of the lubricant 3 in the stage in FIG. 1 before forging is set to 10 µm or more. The coating thickness t is set in this manner based on the results of verification made by the present inventor. The coating thickness t is a coating thickness before forging, which ensures good insulation between two split magnets constituting the integrated magnet that is finally produced.

As the lubricant 3 having an insulating property, slurry formed by mixing boron nitride with an appropriate solvent (an organic solvent, water, or the like) is used.

After the two sintered bodies 1, 2 are arranged side by side with the lubricant 3 interposed therebetween and then housed in the cavity C, hot working (forging) is performed. Specifically, the molding die M is placed in an atmosphere with a temperature of about 600° C. to 900° C., and then the upper punch Pu and the lower punch Ps are slid in the cavity C in directions (a direction X2 and a direction X3) in which the sintered bodies 1, 2 are pushed by the upper punch Pu and the lower punch Ps, as illustrated in FIG. 2.

Hot working with a high working degree (a high compression ratio, or a high rolling reduction ratio), such as hot working with a compression ratio equal to or higher than about 10%, may be referred to as "hot hard working" or referred simply to as "hard working". It is preferable that hot hard working with a compression ratio of 60% to 80% be performed.

After hot working is completed, as illustrated in FIG. 3, the lower punch Ps is moved upward (in a direction X4), so that a product produced through hot working comes out of the cavity C (second step).

The product is an integrated magnet 6 including split magnets 4, 5 and the insulating lubricant 3. The split magnets 4, 5 are formed by imparting magnetic anisotropy to the sintered bodies 1, 2 illustrated in FIG. 1 and plastically deforming the sintered bodies 1, 2 through forging. The insulating lubricant 3 is interposed between the interfaces of the split magnets 4, 5.

In the integrated magnet 6, the split magnets 4, 5 are lightly connected to each other to such a degree that the split magnets 4, 5 are not separated from each other during subsequent handling, instead of being firmly connected to each other.

After the integrated magnets 6 are produced, as illustrated in FIG. 4, the integrated magnets 6 are sequentially inserted into magnet slots S of a rotor R that has been already produced.

The rotor R is formed by stacking a plurality of annular magnetic steel sheets up to a predetermined height and then integrating the magnetic steel sheets by, for example, crimping. Each magnetic steel sheet has an opening Ra for a rotor shaft, and the opening Ra is at the center of the magnetic steel sheet. The number of the magnet slots S formed in the rotor R corresponds to the number of magnetic poles.

FIG. 4 illustrates a state where the integrated magnets 6 have already been inserted into and installed in five magnet slots S, and the integrated magnet 6 is going to be inserted into the remaining magnet slot S (in a direction X5).

As described above, the two split magnets 4, 5 constituting the integrated magnet 6 are connected to each other via the lubricant 3 to such a degree that the split magnets 4, 5 are not separated from each other during handling from removal of the integrated magnet 6 from the molding die M until insertion of the integrated magnet 6 into the magnet slot S.

Thus, it is possible to perform work from production of the integrated magnet 6 in the molding die M to insertion of the integrated magnet 6 into the magnet slot S of the rotor R.

In the integrated magnet 6, the split magnets 4, 5 formed by plastically deforming the two sintered bodies 1, 2 through forging performed in the molding die M are integrated with each other. Thus, the dimensional accuracy of the integrated magnet 6 is high, so that the dimensional accuracy need not be controlled as rigorously as in a production method in which two split magnets are produced independently from each other and then integrated with each other through adhesion. In the latter production method, each split magnet has its own dimensional deviation, and the dimensional deviation of the whole integrated magnet is the sum of the dimensional deviations of all the split magnets. Therefore, the dimensional accuracy of each of the split magnets needs to be rigorously controlled.

The integrated magnets 6 are inserted into and installed in all of the magnet slots S, so that the rotor R is produced (third step). In the rotor R produced in this way, all the integrated magnets 6 inserted into and installed in the magnet slots S are each constituted by the split magnets 4, 5 connected to each other with the insulating lubricant 3 interposed therebetween. Thus, the rotor R has a good eddy-current loss reduction effect.

Next, an experiment for defining a pre-forging coating thickness of a lubricant made of boron nitride and the results thereof will be described. The inventor performed an experiment for defining a pre-forging coating thickness of a lubricant made of boron nitride. In this experiment, the pre-forging coating thickness of the lubricant was set to four values, that is, 5 μm, 10 μm, 20 μm, and 50 μm. Then, each of the lubricant having a coating thickness of 5 μm, the lubricant having a coating thickness of 10 μm, the lubricant having a coating thickness of 20 μm, and the lubricant having a coating thickness of 50 μm was disposed on interfaces of two sintered bodies, and the sintered bodies were subjected to forging to produce an integrated magnet (a test piece). Then, a continuity test was performed three times on each test piece to check whether the test piece is electrically continuous. In this continuity test, CARD HiT-ESTER 3244 manufactured by HIOKI E. E. CORPORATION was used as a measuring device.

The dimensions of one sintered body before forging was 4 mm×24 mm×9 mm. Boron nitride (ABL manufactured by SHOWA DENKO) was used as the lubricant.

The two sintered bodies with the lubricant applied to their interfaces were forged under the conditions that the temperature of a molding die during forging was 780° C., the rolling reduction ratio was 67%, and the working time was 12.8 seconds. As a result, an integrated magnet having dimensions of 14.5 mm×46 mm×5 mm as a whole was produced.

Figure 5A:
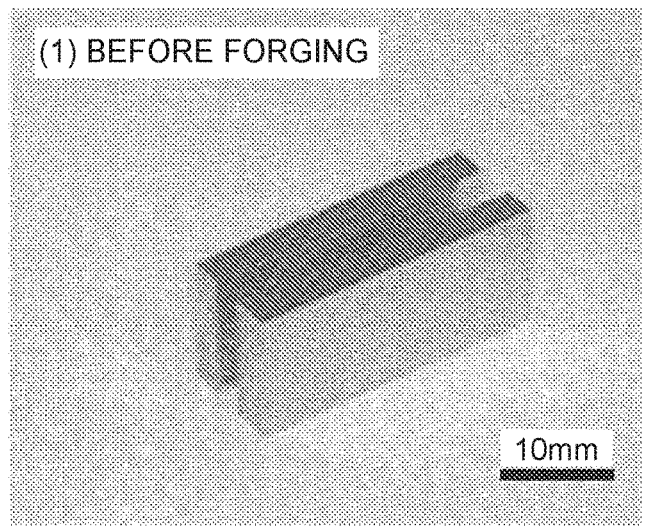
FIG. 5A is a photographic view illustrating two sintered bodies and a lubricant on interfaces of the sintered bodies before hot working (forging)

The measurement results are indicated in Table 1. A test piece before forging and the test piece after forging are indicated in photographic views in FIG. 5A and FIG. 5B, respectively.

TABLE 1

| Pre-forging Coating Thickness of Lubricant (μm) | Insulating Property | | |
| --- | --- | --- | --- |
| | First Measurement | Second Measurement | Third Measurement |
| 5 | Observed | Not observed | Observed |
| 10 | Not observed | Not observed | Not observed |
| 20 | Not observed | Not observed | Not observed |
| 50 | Not observed | Not observed | Not observed |

Not observed: Electrical continuity was not observed.
Observed: Electrical continuity was observed.

Figure 5B:
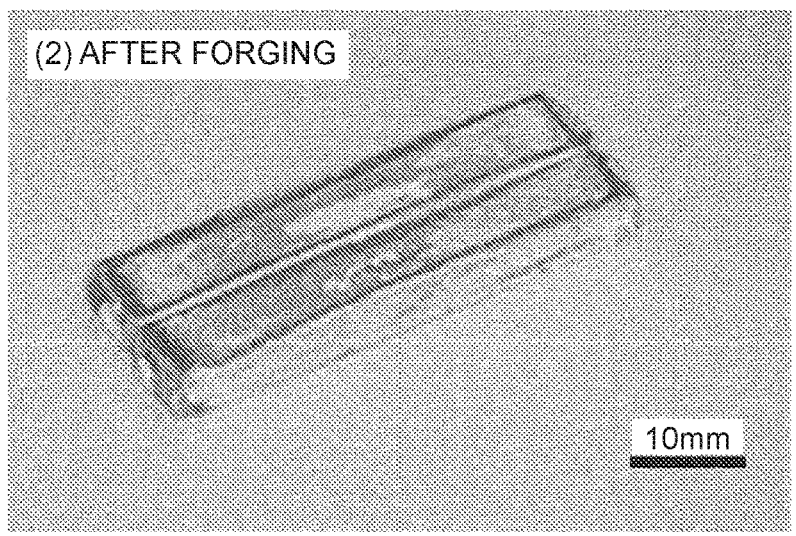
FIG. 5B is a photographic view illustrating an integrated magnet after hot working.

As illustrated in FIG. 5B, it was confirmed that, in each of the integrated magnets after forging, the two split magnets were integrated together with the lubricant interposed therebetween and the split magnets were not separated from each other during handling.

Further, as indicated in Table 1, electrical continuity was observed when the pre-forging coating thickness of the lubricant was 5 μm, whereas electrical continuity was not observed when the pre-forging coating thickness was equal to or more than 10 μm.

It is understood from the measurement results that the pre-forging coating thickness of the lubricant is preferably set to 10 μm or more when boron nitride is used as the lubricant.

While one embodiment of the invention has been described in detail with reference the drawings, the specific configurations are not limited to those in the foregoing embodiment, and design changes and the like within the scope of the invention are also included in the scope of the invention.

What is claimed is:

1. A rotor production method comprising:
    arranging a plurality of sintered bodies side by side with an insulating lubricant applied to a side surface of at least one of any two immediately adjacent ones of the sintered bodies, and then housing the sintered bodies in a cavity of a molding die such that the sintered bodies are arranged side by side in the cavity, the sintered bodies being precursors of a plurality of split magnets constituting one rare-earth magnet;
    turning the sintered bodies into the split magnets by performing hot working to impart magnetic anisotropy to the sintered bodies arranged side by side in the cavity, and producing an integrated magnet in which the split magnets are integrated with each other with the lubricant interposed between the split magnets; and
    producing a rotor of a motor by inserting the integrated magnet into a magnet slot of the rotor.

2. The rotor production method according to claim 1, wherein the lubricant contains boron nitride.

3. The rotor production method according to claim 1, wherein a pre-hot working thickness of the lubricant is equal to or more than 10 μm.

4. The rotor production method according to claim 1, wherein each of the sintered bodies has a Nd—Fe—B-based main phase with a nanocrystalline structure, and a grain boundary phase of a Nd—X alloy, where X is a metal element, the grain boundary phase being present around the main phase.

5. The rotor production method according to claim 4, wherein:
    the Nd—X alloy constituting the grain boundary phase is any one of Nd—Co, Nd—Fe, Nd—Ga, Nd—Co—Fe, and Nd—Co—Fe—Ga, or is a mixture of at least two of Nd—Co, Nd—Fe, Nd—Ga, Nd—Co—Fe, and Nd—Co—Fe—Ga; and
    the Nd—X alloy is in a Nd-rich state.

* * * * *